(12) United States Patent
Kim

(10) Patent No.: US 7,094,976 B2
(45) Date of Patent: Aug. 22, 2006

(54) VEHICLE WEIGHT MEASURING STRUCTURE AND VEHICLE WEIGHT MEASURING APPARATUS USING THE SAME

(75) Inventor: Ki-Soo Kim, Sungmam (KR)

(73) Assignee: Ices Co., Ltd., Chungnam (KR)

( * ) Notice: Subject to any disclaimer, the term of this patent is extended or adjusted under 35 U.S.C. 154(b) by 164 days.

(21) Appl. No.: 10/633,968

(22) Filed: Aug. 4, 2003

(65) Prior Publication Data

US 2005/0029018 A1 Feb. 10, 2005

(51) Int. Cl.
*G01G 19/02* (2006.01)
(52) U.S. Cl. ............... 177/132; 177/133; 177/134
(58) Field of Classification Search ........ 177/132–135, 177/DIG. 6, DIG. 9
See application file for complete search history.

(56) References Cited

U.S. PATENT DOCUMENTS

| | | | | |
|---|---|---|---|---|
| 4,483,404 A | * | 11/1984 | Weihs | 177/255 |
| 4,516,646 A | * | 5/1985 | Bergfalk | 177/211 |
| 4,560,016 A | * | 12/1985 | Ibanez et al. | 177/210 R |
| 4,744,254 A | * | 5/1988 | Barten | 73/862.622 |
| 5,801,339 A | * | 9/1998 | Boult | 177/261 |
| 6,177,639 B1 | * | 1/2001 | Feilner | 177/134 |

* cited by examiner

*Primary Examiner*—Randy W. Gibson
(74) *Attorney, Agent, or Firm*—The Webb Law Firm

(57) ABSTRACT

Disclosed is a vehicle weight measuring structure. The structure comprises a base plate; a plurality of support elements placed on the base plate, each support element having a pair of legs which project downward and are separated from each other by a predetermined distance to be brought into contact with the base plate, each leg having a free end serving as a contact part which possesses a rounded contour; and a structure body horizontally supported by the plurality of support elements in a manner such that an upper surface of the structure body and an upper surface of a road become coplanar, for transferring a load of a vehicle traveling on the road to the support elements.

12 Claims, 5 Drawing Sheets

VEHICLE WEIGHT MEASURING STRUCTURE AND VEHICLE WEIGHT MEASURING APPARATUS USING THE SAME

BACKGROUND OF THE INVENTION

1. Field of the Invention

The present invention relates, in general, to an apparatus which is built in a road to measure a weight of a vehicle traveling on the road and, more particularly, to a vehicle weight measuring structure and a vehicle weight measuring apparatus using the same.

2. Description of the Prior Art

As well known to those skilled in the art, a vehicle weight measuring apparatus is built in a road on which vehicles travel, to collect various data related with weights of the vehicles while not hindering traffic flow. The vehicle weight measuring apparatus functions to check an overspeeding vehicle or an overloaded vehicle.

Sensors used in the conventional vehicle weight measuring apparatus are classified into those which employ, upon application of a load, electrical resistance change as in the case of a strain gauge, capacitance change or a piezoelectric effect.

However, the conventional apparatus suffers from defects in that measurement precision is low and therefore it is difficult to actually apply the apparatus in practice. Also, due to the fact that a vehicle weight measuring structure used in the conventional apparatus is mainly made of plastic, a lengthy period of time is required until plastic is returned to its original state after removal of a load, whereby vehicle weight measuring operation cannot but be retarded.

SUMMARY OF THE INVENTION

Accordingly, the present invention has been made keeping in mind the above problems occurring in the prior art, and an object of the present invention is to provide a vehicle weight measuring structure which has a high grade of precision and operational stability, and a vehicle weight measuring apparatus using the same.

Another object of the present invention is to provide a vehicle weight measuring structure which allows vehicle weight measurement operation to be continuously conducted, and a vehicle weight measuring apparatus using the same.

Still another object of the present invention is to provide a vehicle weight measuring apparatus which uses an optical fiber sensor and has a high grade of precision and operational stability.

In order to achieve the above-described objects, according to one aspect of the present invention, there is provided a vehicle weight measuring structure comprising: a base plate; a plurality of support elements placed on the base plate, each support element having a pair of legs which project downward from a lower surface of the support element in a manner such that the pair of legs can be diverged by application of external force; and a structure body horizontally supported by the plurality of support elements in a manner such that an upper surface of the structure body and an upper surface of a road become coplanar, for transferring a load of a vehicle traveling on the road to the support elements. Each leg of the support element has a free end serving as a contact part which possesses a rounded contour to be brought into contact with the base plate.

According to another aspect of the present invention, there is provided a vehicle weight measuring apparatus comprising: a base plate received in a quadrangular opening which is dug in a road to have a predetermined depth, for rendering a horizontal support surface; a plurality of support elements placed on the base plate, each support element having a pair of legs which project downward from a lower surface of the support element and are separated from each other by a predetermined distance to be brought into contact with the base plate, each leg having a free end serving as a contact part which possesses a rounded contour; a structure body horizontally supported by the plurality of support elements in a manner such that an upper surface of the structure body and an upper surface of a road become coplanar, for transferring a load of a vehicle traveling on the road to the support elements; a sensor mounted to the lower surface of the support element, for measuring a strain of the support element on the basis of a load transferred to the support element; and a vehicle weight calculation unit connected to the sensor, for processing and converting strain information from the sensor into a vehicle weight.

According to still another aspect of the present invention, there is provided a vehicle weight measuring apparatus comprising: a base plate received in a quadrangular opening which is dug in a road to have a predetermined depth, for rendering a horizontal support surface; a plurality of support elements placed on the base plate, each support element having a pair of legs which project downward from a lower surface of the support element and are separated from each other by a predetermined distance; an optical fiber sensor installed between the pair of legs and having both ends which are respectively fixed to the pair of legs; a structure body horizontally supported by the plurality of support elements in a manner such that an upper surface of the structure body and an upper surface of a road become coplanar, for transferring a load of a vehicle traveling on the road to the support elements; and a vehicle weight calculation unit connected to the optical fiber sensor, for processing and converting strain information from the optical fiber sensor into a vehicle weight.

By the features of the present invention, it is possible to measure a weight of a vehicle traveling on a road, with a high grade of precision, operational stability and reliability. Also, the apparatus according to the present invention allows vehicle weight measurement operation to be continuously conducted.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
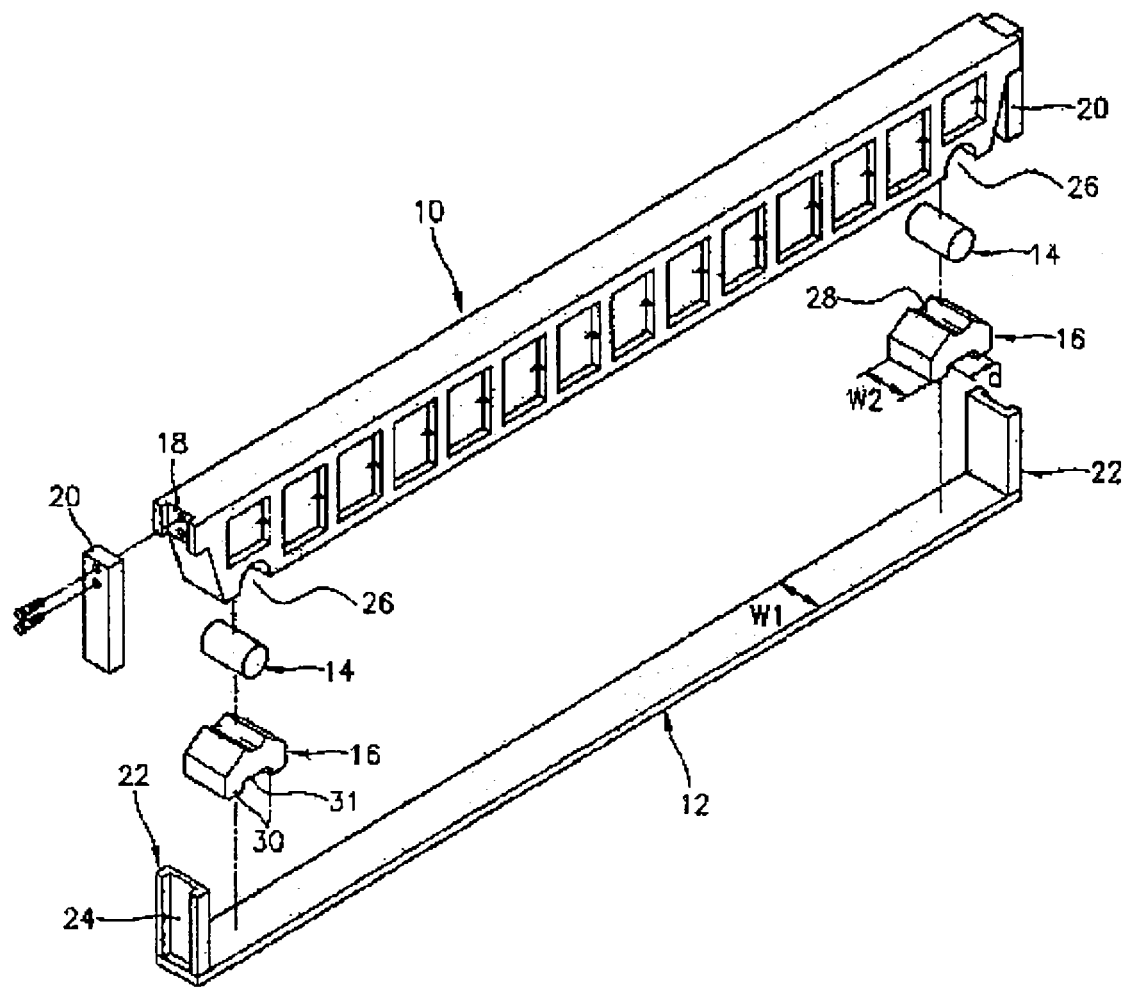
FIG. 1 is an exploded perspective view illustrating a vehicle weight measuring structure in accordance with a first embodiment of the present invention.

Reference should now be made to the drawings, in which the same reference numerals are used throughout the different drawings to designate the same or similar components.

FIG. 1 is an exploded perspective view illustrating a vehicle weight measuring structure in accordance with a first embodiment of the present invention.

As can be readily seen from FIG. 1, the vehicle weight measuring structure according to the present invention comprises a base plate 12, a structure body 10, a pair of support elements 16, and a pair of pressing members 14. The base plate 12 has a configuration of a band which possesses a predetermined thickness and width W1. The structure body 10 is horizontally positioned on the base plate 12. The pair of support elements 16 are intervened between the structure body 10 and the base plate 12 to horizontally support the structure body 10. The pair of pressing members 14 are interposed between the structure body 10 and the support elements 16. It is preferred that the structure body 10, base plate 12, support elements 16 and pressing members 14 are made of a material which has predetermined strength and elasticity. Particularly, it is preferred that a metallic material having the predetermined strength and elasticity, for example, carbon steel, is used.

Figure 5:
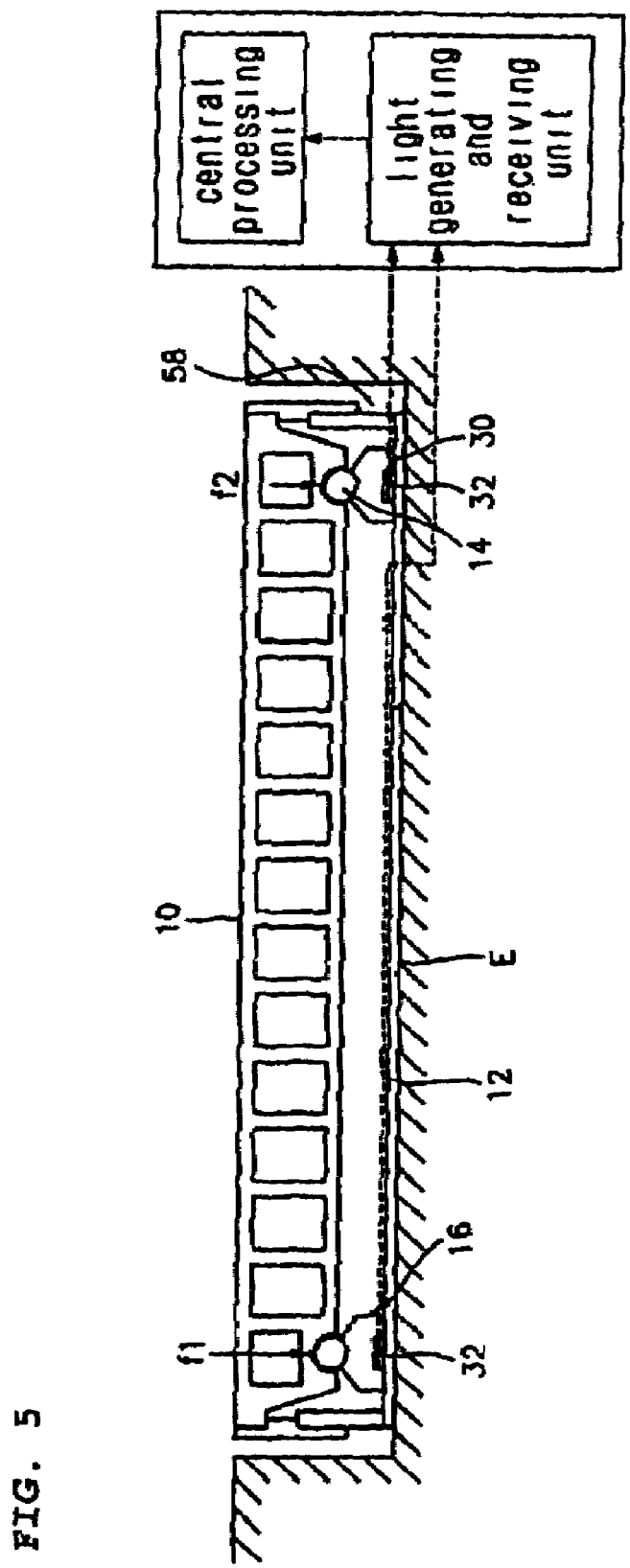
FIG. 5 is a schematic front view illustrating a vehicle weight measuring apparatus using the optical fiber sensor according to the second embodiment of the present invention.

As shown in FIG. 5, the base plate 12 is installed on a bottom surface E of a quadrangular opening 58 which is dug in a road to have a predetermined depth. The base plate 12 supports both of the pair of support elements 16 at the same height with respect to the bottom surface E.

A pair of vertical guiders 22 are respectively fastened to both ends of the base plate 12. Each vertical guider 22 has a lower end which is fastened to the base plate 12 and an upper end which extends upward. A support groove 24 which extends in a vertical direction is defined on an outer surface of each vertical guider 22. A guide block 20 as will be described later in detail is inserted into the support groove 24.

The pair of support elements 16 are positioned adjacent to the pair of vertical guiders 22, respectively. It is preferred that the pair of support elements 16 have the same configuration and size. Each support element 16 comprises a block having a width W2 and is positioned on the base plate 12. The support element 16 is not fastened to the base plate 12. Here, the width W2 is determined to be equal to or less than the width W1.

The support element 16 has a pressing surface 28 at a middle portion of an upper end thereof. A pair of legs 30 are formed on a lower surface of the support element 16. The legs 30 are formed integrally with the support element 16 and separated from each other by a distance 'd'. The legs 30 are parallel to each other and project downward from the lower surface of the support element 16. As can be readily seen from FIG. 3A, a free end of each leg 30 has a rounded contour.

It is preferred that the pressing member 14 comprises a round bar having a circular sectional shape. A circumferential outer surface of the pressing member 14 is partially brought into contact with the pressing surface 28. It is appropriate that radii of curvature of the pressing member 14 and the pressing surface 28 are determined to allow the pressing surface 28 to be brought into complete surface contact with the outer surface of the pressing member 14. More preferably, the pressing member 14 has the same radius of curvature as the pressing surface 28.

The structure body 10 is made of a metallic material in a manner such that the structure body 10 is not bent downward by a load of a vehicle. A pair of engaging grooves 26 are defined on a lower surface and adjacent to both ends of the structure body 10 in a manner such that the pair of pressing members 14 are partially engaged into the pair of engaging grooves 26, respectively. A bottom surface of the engaging groove 26 is brought into contact with an outer surface of the pressing member 14. At this time, it is preferred that the bottom surface of the engaging groove 26 and the outer surface of the pressing member 14 have the same radius of curvature.

A pair of mounting grooves 18 are defined at both ends of the structure body 10, respectively. A pair of guide blocks 20 are partially inserted into the mounting grooves 18 and fastened to the structure body 10. Due to this fact, the guide blocks 20 extend downward in a vertical direction.

Each guide block 20 is partially inserted into the support groove 24 of the vertical guider 22 to guide fine vertical movement of the structure body 10 while supporting the structure body 10.

Figure 2:
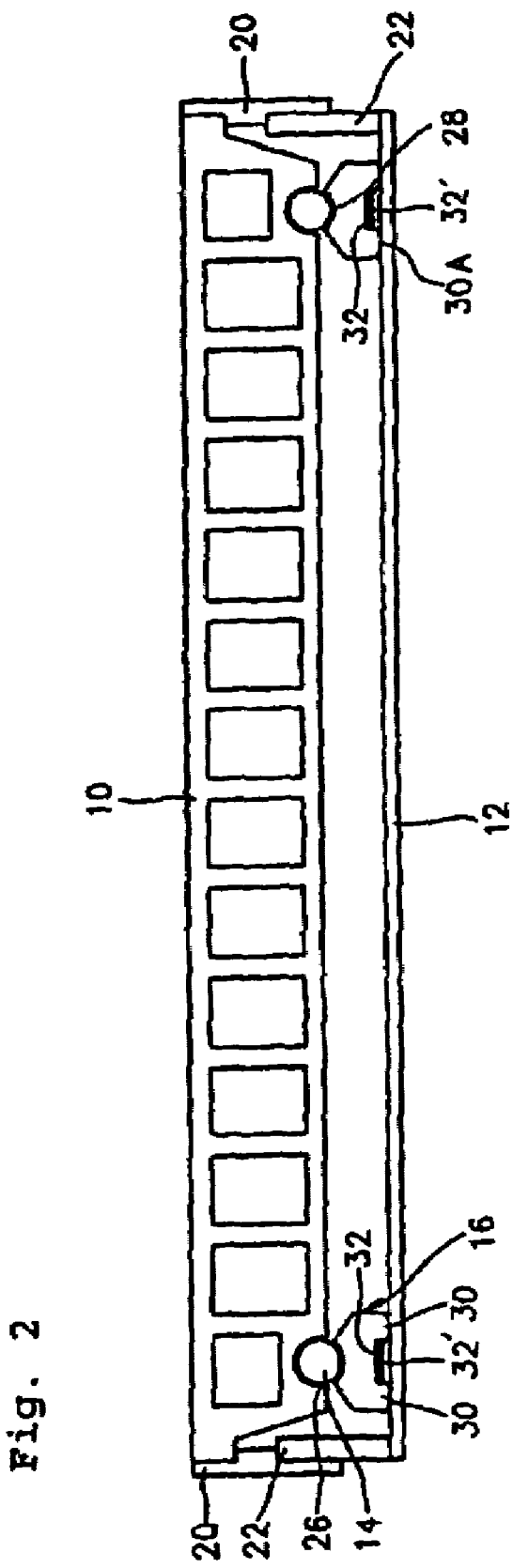
FIG. 2 is a front view illustrating an assembled state of the vehicle weight measuring structure shown in FIG. 1.

FIG. 2 is a front view illustrating an assembled state of the vehicle weight measuring structure shown in FIG. 1. As shown in FIG. 2, the structure body 10 is horizontally placed on the base plate 12. Upper parts of the pressing members 14 are respectively brought into contact with the engaging grooves 26 which are defined on the lower surface of the structure body 10. Lower parts of the pressing members 14 are respectively brought into contact with the pressing surfaces 28 of the support elements 16.

Figure 3A:
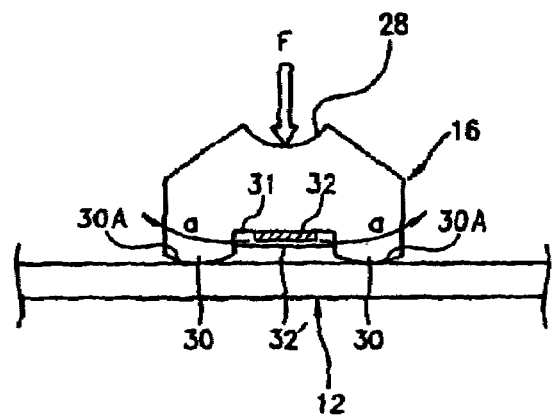
FIG. 3A is a partial front view illustrating a support element used in the vehicle weight measuring structure according to the first embodiment of the present invention.

A vehicle weight measuring sensor may be mounted to each of the support elements 16 which horizontally support the structure body 10 via the pressing members 14. As the vehicle weight measuring sensor, all type of sensors capable of converting a change in physical length into a load may be used. The sensor may comprise a strain gauge, a load cell, a capacitive sensor, an optical fiber sensor, etc. Preferred mounting positions of these sensors 32 and 32' are illustrated in FIG. 3A. The sensor 32 such as the strain gauge, the load cell and the capacitive sensor may be mounted to a lower surface 31 of the support element 16 in a space between the pair of legs 30, and the linear sensor 32' such as the optical fiber sensor may be mounted in insertion grooves 34 which are defined on the free ends of the legs 30, which free ends serve as contact parts 30A of FIG. 3A.

Referring again to FIG. 2, the guide blocks 20 which are fastened to both ends of the structure body 10 are inserted into the support grooves 24 which are defined on the outer surfaces of the vertical guiders 22, so that the structure body 10 can be stably supported with respect to the base plate 12.

While the structure having two support elements 16 was exemplified in the above description, a person skilled in the art will readily recognize that three or more support elements 16 can be used as occasion demands, in order for uniform distribution of a vehicle load.

FIG. 3A is a partial front view illustrating the support element used in the vehicle weight measuring structure according to the first embodiment of the present invention.

Referring to FIG. 3A, it is to be noted that the contact parts 30A of the legs 30 of the support elements 16 are convexed downward to define a rounded contour. Due to this rounded contour of the contact parts 30A, each support element 16 is brought into line contact with an upper surface of the flat base plate 12.

Figure 3B:
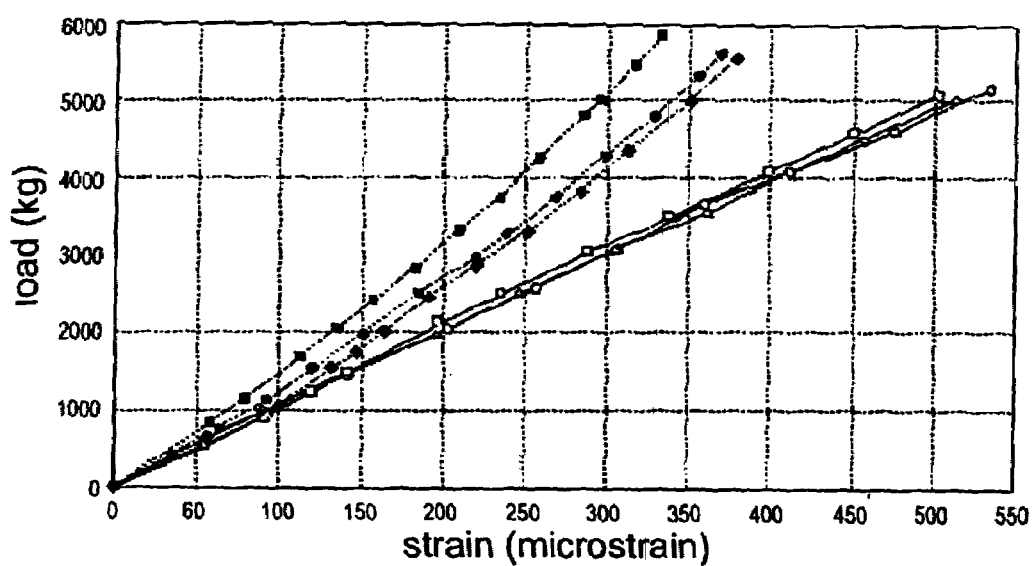
FIG. 3B is a graph illustrating a relationship between a load and a strain which is measured depending upon a sectional shape of a contact part of the support element.

By the fact that the contact parts 30A of the legs 30 of the support elements 16 are formed to have the rounded contour, when assuming that a load F is applied to the pressing surfaces 28 in a direction indicated by the arrow in FIG. 3A, it is possible to improve a strain change characteristic of the support element 16. Hereafter, this will be described in detail with reference to the attached figures. As shown in FIG. 3A, if a load F is applied to the support elements 16, tensile force is applied to the lower surface 31 of each support element 16 due to the presence of the pair of legs 30, whereby a strain is generated. This strain can be measured by mounting the sensor 32 such as the strain gauge to the lower surface 31 of the support element 16. FIG. 3B is a graph illustrating a relationship between a load and a strain which is measured by the strain gauge attached to the lower surface 31 of the support element 16 supposing two cases where the contact part 30A of the leg 30 has flattened and rounded contours. For each case, measurement was made for three support element samples. In FIG. 3B, the dotted line illustrates a relationship between a load and a strain when the contact part 30A has the flattened contour, whereas the solid line illustrates a relationship between a load and a strain when the contact part 30A has the rounded contour. As can be readily seen from FIG. 3B, in the case that the contact part 30A has the rounded contour, the strain increases linearly with increasing of load. On the contrary, in the case that the contact part 30A has the flattened contour, the relationship between a load and a strain revealed a curved feature. Also, it is to be noted that, when compared to the strain value deviation in the case of the support element samples having the flattened contact parts 30A, the strain value deviation in the case of the support element samples having the rounded contact parts 30A is remarkably reduced.

This results from the fact that, as a load varies, contact behavior between the legs 30 of the support element 16 and the base plate 12 is changed. That is to say, in the case that the contact part 30A of the support element 16 has the flattened contour, as the legs 30 of the support element 16 are twisted with the increase of load, a surface contact state is likely to be changed to a line contact state or a point contact state, to thereby cause an abrupt strain increase. This unstableness of the contact state varies depending upon a flatness of the contact part 30A of each support element sample. Therefore, a substantial strain deviation is caused depending upon a sample. However, in the case that the contact part 30A of the support element 16 has the rounded contour, although the legs 30 are deformed by load application, the line contact between the contact part 30A and the base plate 12 is always maintained, and abrupt strain change is not caused even with load variation. Accordingly, the vehicle weight measuring structure according to the present invention allows vehicle weight measuring operation to be conducted with a high grade of precision and accomplishes operational stability.

In the above description, it was exemplified that the contact part 30A of the support element 16 is brought into line contact with the base plate 12. However, even when the contact part 30A is brought into point contact with the base plate 12, that is, even when the contact part 30A is formed to have a semi-spherical contour, a person having ordinary skill in the art will readily recognize that a stable contact state between the contact parts 30A and the base plate 12 can be secured irrespective of a magnitude of an applied load.

Hereinafter, another aspect of the present invention will be described with reference to FIG. 4. In this regard, FIG. 4 is an exploded perspective view concretely illustrating a variation of the support element, which is adapted for mounting an optical fiber sensor in accordance with a second embodiment of the present invention.

Figure 4:
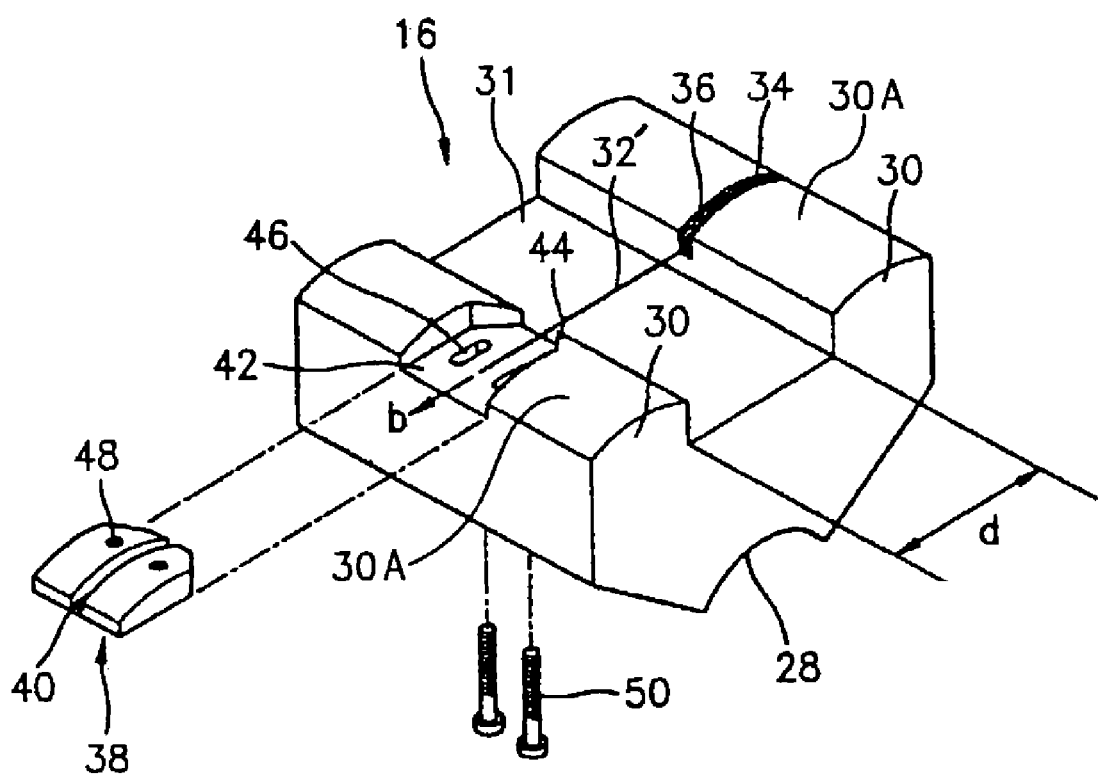
FIG. 4 is an exploded perspective view concretely illustrating a variation of the support element, which is adapted for mounting an optical fiber sensor in accordance with a second embodiment of the present invention.

As shown in FIG. 4, the contact part 30A of each leg 30 is formed to have the rounded contour. The pair of legs 30 are separated from each other by a distance designated by the reference character 'd'. It is preferred that the rounded contact parts 30A of both legs 30 have the same radius of curvature. Since the distance 'd' between the legs 30 may directly influence a strain level, it can be adjusted to obtain a strain level appropriate for measurement. For example, when the Chirpped FBG (Fiber Bragg Grating) sensor is used, the distance 'd' between the legs 30 can be adjusted so that 500~1500 micro strain is caused within a conventional load application range.

As described above, a load applied to the support element 16 generates strain on the lower surface 31 of the support element 16. As a consequence, by mounting one of various sensors for measuring the strain to the lower surface 31 of the support element 16, it is possible to measure a load applied to the support element 16. In the case that the optical fiber sensor is used as the vehicle weight measuring sensor, while the optical fiber sensor may be mounted directly on the lower surface 31 of the support element 16, separate mounting grooves 36 and 40 may be defined on the contact parts 30A as shown in FIG. 4 to allow mounting of the optical fiber sensor.

Referring to FIG. 4, the optical fiber sensor 32' is placed between both legs 30 of the support element 16, and both ends of the optical fiber sensor 32' are respectively fixed to the legs 30 to be maintained at a tensed state. As the optical fiber sensor 32', the interference type sensor or the FBG sensor may be used.

In order to allow the optical fiber sensor 32' to be fixed to the legs 30, the contact parts 30A of the respective legs 30 are defined with the insertion grooves 36 and 40.

The insertion grooves 36 and 40 are aligned with each other and comprise slits which have a preselected width and are opened at both ends of them. The insertion grooves 36 and 40 extend in a direction perpendicular to a line along which the legs 30 and the base plate 12 are brought into contact with each other, to receive both ends of the optical fiber sensor, respectively.

Also, as shown in FIG. 4, one insertion groove 40 may be defined in a steel piece 38 which can be fitted to and removed from the contact part 30A of one leg 30. The steel piece 38 serves as a segment capable of being detached from one leg 30. The steel piece 38 can be fastened to one leg 30 by fastening bolts 50.

To this end, one leg 30 is defined with a mounting groove 42 in which the steel piece 38 is to be mounted. A pair of slots 46 are defined through a bottom surface of the mounting groove 42. Of course, it is to be readily understood that the mounting groove 42 is defined in conformity with a configuration of the steel piece 38. The fastening bolts 50 respectively pass through the slots 46 in a vertical direction, to be locked into internally threaded holes 48 which are defined through the steel piece 38.

At an inner end of the mounting groove 42, a stopper projection 44 is formed integrally with one leg 30. The stopper projection 44 functions to support the steel piece 38 in a direction indicated by the arrow 'b' in FIG. 4. The stopper projection 44 for stably supporting the steel piece 38 may not be formed as occasion demands.

The steel piece 38 has a lower surface which defines a rounded contour in a manner such that the lower surfaces of one leg 30 and the steel piece 38 cooperate with each other to define a single rounded contour.

Preferably, the insertion groove 40 is defined in such a way as to ensure that, with the steel piece 38 fitted into the mounting groove 42, the insertion groove 40 is arranged in line with the insertion groove 36. Due to this fact, in a state wherein both ends of the optical fiber sensor 32 are inserted into the insertion grooves 36 and 40, respectively, by applying an adhesive into the insertion grooves 36 and 40, the optical fiber sensor 32 is tensed between the pair of legs 30 while both ends thereof are aligned with each other.

As the case may be, if it is necessary to further tense the optical fiber sensor 32, the fastening bolts 50 can be moved in the slots 46 to allow the steel piece 38 to be moved in the direction indicated by the arrow 'b'.

FIG. 5 is a schematic front view illustrating a vehicle weight measuring apparatus using the optical fiber sensor according to the second embodiment of the present invention.

As shown in FIG. 5, the base plate 12 is horizontally installed on the bottom surface E of the quadrangular opening 58 with a predetermined depth which is dug in a road. The structure body 10 is horizontally placed to be supported by the base plate 12 via the pair of support elements 16.

The structure body 10 is held coplanar with the upper surface of the road, so that the vehicle is not rattled while passing over the structure body 10. While, in the preferred embodiment of the present invention, the upper surface of the structure body 10 has a length of 1~1.5 m and a width of 55~65 cm, it is to be readily understood that concrete dimensions of the structure body 10 may vary as desired.

In the meanwhile, the optical fiber sensor 32 which is fixed to the legs 30 of the support element 16 is connected to an external measurement section 56. The measurement section 56 includes a light generating and receiving unit 54 and a central processing unit 52. The measurement section 56 serves to sense a lengthened degree of the optical fiber sensor 32 and then calculate a load corresponding to the lengthened degree.

The light generating and receiving unit 54 functions to radiate light to the optical fiber sensor 32' and receive light signal comprising strain information from the optical fiber sensor 32', and then transmit electrical signal corresponding to the light signal to the central processing unit 52. The central processing unit 52 internally processes the electrical signal from the light generating and receiving unit 54 and then determine a weight of a vehicle which just passed over the structure body 10.

Hereinbelow, operations of the vehicle weight measuring apparatus according to the present invention, constructed as mentioned above, will be described.

If wheels of a traveling vehicle pass over the structure body 10, at that time, a load of the vehicle is transferred to the pressing members 14 and the support elements 16 which are positioned below both ends of the structure body 10, at magnitudes of f1 and f2. At this time, it is to be noted that, depending upon a position over which the wheels of the vehicle pass, the magnitudes of the force f1 and f2 may vary.

The legs 30 of the support elements 16 which receive the force f1 and f2 are diverged in a direction indicated by the arrow 'a' in FIG. 3A in proportion to the applied force f1 and f2. As the legs 30 are diverged, the optical fiber sensor 32 maintained in a tensed state is slightly lengthened. Thus information related to the lengthened degree of the optical fiber sensor 32 is transmitted to the external measurement section 56. The measurement section 56 converts the information to load constituents which pressed downward the structure body 10. Thereby, the magnitudes of the force f1 and f2 can be determined respectively.

The magnitudes of the force f1 and f2 are summed through a conventional method to finally obtain a load which pressed the structure body 10.

As apparent from the above description, the vehicle weight measuring structure according to the present invention, constructed as mentioned above, provides advantages in that a contact part of a support element has a rounded contour, and a structure body, the support element and a pressing member are formed of a metallic material with excellent elasticity and strength. As a consequence, the support element can be returned to its original contour immediately after removal of a load, whereby it is possible to continuously conduct vehicle weight measuring operation. Further, the vehicle weight measuring structure and the vehicle weight measuring apparatus using the same according to the present invention accomplish a high grade of measurement precision and operational stability. Moreover, the vehicle weight measuring structure using an optical fiber sensor according to the present invention provides advantages in that, because the optical fiber sensor is less susceptible to temperature change and is hardly influenced by the surrounding electric or magnetic field, measurement reliability is enhanced.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A vehicle weight measuring apparatus comprising:
   a base plate received in a quadrangular opening which is dug in a road to have a predetermined depth, for rendering a horizontal support surface;
   a plurality of support elements placed on the base plate, each support element having a pair of legs which project downward from a lower surface of the support element and are separated from each other by a predetermined distance to be brought into contact with the base plate, each leg having a free end serving as a contact part which possesses a rounded contour;
   a structure body horizontally supported by the plurality of support elements in a manner such that an upper surface of the structure body and an upper surface of a road become coplanar, for transferring a load of a vehicle traveling on the road to the support elements;
   a sensor mounted to the lower surface of the support element, for measuring a strain of the support element on the basis of a load transferred to the support element; and
   a vehicle weight calculation unit connected to the sensor, for processing and converting strain information from the sensor into a vehicle weight.

2. The apparatus as set forth in claim 1, wherein the sensor comprises one selected from a group consisting of a strain gauge, a load cell, a capacitive sensor and an optical fiber sensor.

3. The apparatus as set forth in claim 1, wherein the base plate, the support element and the structure body are made of a metallic material.

4. A vehicle weight measuring apparatus comprising:
a base plate received in a quadrangular opening which is dug in a road to have a predetermined depth, for rendering a horizontal support surface;
a plurality of support elements placed on the base plate, each support element having a pair of legs which project downward from a lower surface of the support element and are separated from each other by a predetermined distance;
an optical fiber sensor installed between the pair of legs and having both ends which are respectively fixed to the pair of legs;
a structure body horizontally supported by the plurality of support elements in a manner such that an upper surface of the structure body and an upper surface of a road become coplanar, for transferring a load of a vehicle traveling on the road to the support elements; and
a vehicle weight calculation unit connected to the optical fiber sensor, for processing and converting strain information inputted from the optical fiber sensor into a vehicle weight.

5. The apparatus as set forth in claim 4, wherein each leg to be brought into contact with the base plate has a free end serving as a contact part which possesses a rounded contour.

6. The apparatus as set forth in claim 4, further comprising:
a plurality of pressing members interposed between the structure body and the support elements, respectively, to transfer downward pressing force of the structure body to the support elements.

7. The apparatus as set forth in claim 6, wherein each pressing member comprises a round bar, and a pair of engagement grooves for engagement of each round bar are respectively defined on a lower surface of the structure body and an upper surface of each support element.

8. The apparatus as set forth in claim 6, wherein the upper surface of each support element includes a pressing surface which is brought into surface contact with an outer surface of the pressing member, the pair of legs of the support element positioned directly below the pressing surface of each support element, the contact part of each leg brought into line contact with the base plate.

9. The apparatus as set forth in claim 4, wherein the contact parts of the pair of legs are defined with a pair of optical fiber sensor-insertion grooves, respectively, which are aligned with each other.

10. The apparatus as set forth in claim 9, wherein one of the pair of legs comprises a steel piece formed in the contact parts, the steel piece allowing a position of the insertion grooves relative to the legs to be adjusted as desired.

11. The apparatus as set forth in claim 4, wherein
a pair of support elements are provided to be positioned at both ends of the base plate, respectively; and
the structure body comprises a beam which has an upper surface of a predetermined width and extends parallel to the base plate.

12. The apparatus as set forth in claim 4, wherein the optical fiber sensor comprises an interference type sensor or a Fiber Bragg Grating (FBG) sensor.

* * * * *